Oct. 11, 1955  P. I. RICHARDS ET AL  2,720,593
SCINTILLATION-TYPE ION DETECTOR
Filed Dec. 5, 1950

INVENTORS
PAUL I. RICHARDS
EARL E. HAYS
BY
Roland A. Anderson
Attorney

United States Patent Office 2,720,593
Patented Oct. 11, 1955

2,720,593

SCINTILLATION-TYPE ION DETECTOR

Paul I. Richards, Bellport, and Earl E. Hays, Eastport, N. Y., assignors to the United States of America as represented by the United States Atomic Energy Commission Application December 5, 1950, Serial No. 199,294

3 Claims. (Cl. 250—41.9)

The present invention relates to a method and apparatus for detecting moving charged particles in the presence of an intense magnetic field. In mass spectrometers and other similar analytical devices, a beam of ions is projected into a magnetic analyzer which resolves the beam into its characteristic mass components. To identify the different mass components it is necessary to accurately detect the position of the charged particles at a particular time.

For certain types of mass spectrometers, such as the time-of-flight mass spectrometer disclosed in application Serial No. 83,258 (S. A. Goudsmit), it is advantageous for the detecting apparatus to be located in the magnetic field of the analyzer. However, as an intense magnetic field is commonly used with mass spectrometers, conventional detection instruments such as electron multipliers will have their operation seriously impaired if they are located in the magnetic field. On the contrary, the apparatus of the present invention can be used in an intense magnetic field without its operation being affected.

It is accordingly an object of the present invention to provide a method and apparatus for detecting moving charged particles.

Another object of the invention is to provide an ion detector which can be used in an intense magnetic field.

A third object of the invention is to provide an ion detector that can be easily dismantled for replacement of parts.

A further object of the present invention is to provide a scintillation ion detector that can be used in the magnetic field of a mass spectrometer.

Other objects and advantages will be in part obvious and in part pointed out hereinafter.

More particularly, a preferred embodiment of the present invention includes an elongated translucent member having one end located in the magnetic field containing the moving charged particles to be detected. A high accelerating potential is applied near this end of the member to attract the charged particles thereto. A substance that will luminesce when the charged particles impinge thereon is coated on the same end of said translucent member. The photons resulting from said luminescence are transmitted through the member outside of the magnetic field where they are detected and amplified by a photomultiplier tube.

The many objects and advantages of the present invention may best be appreciated by reference to the accompanying drawings, the figures of which illustrate apparatus incorporating a preferred embodiment of the present invention and capable of carrying out the method of the invention. In the drawings.

Figure 1:
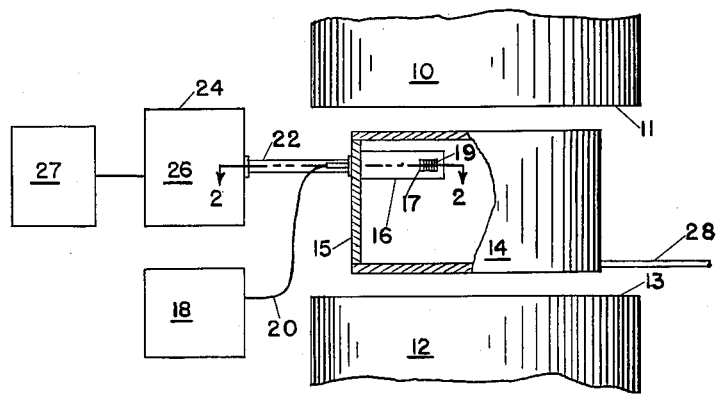
Figure 1 is a schematic and elevational view of a mass spectrometer system with the wall of the spectrometer vacuum chamber broken away to show the position of the detection apparatus of the present invention.

Referring to Figure 1 the magnetic field used to deflect the moving charged particles in the spectrometer is produced between the two poles 10 and 12 of an electromagnet. The lines of magnetic flux produced between the poles are perpendicular to the pole faces 11 and 13. Located between the magnet poles is a mass spectrometer vacuum chamber 14. Inside the vacuum chamber 14 and attached to wall 15 is the electrostatic shield 16 of the detection apparatus of the present invention. A rectangular window 17 is formed in the shield 16 to permit the entrance of the moving charged particles. Fine grid wires 19 are stretched across window 17 and serve a purpose later to be set forth. A conventional high voltage power supply 18 is used to provide an accelerating potential to the detection apparatus by means of conductor 20.

Mounted on the exterior of the spectrometer chamber 14 is a light-tight shield 22 which is connected at its other end to a casing 24 enclosing a photomultiplier tube and amplifier 26. The output of tube and amplifier 26 can be measured on a cathode ray oscilloscope 27 or on other suitable measuring means. Means for evacuating the spectrometer chamber 14 is provided by exhaust line 28.

The moving charged particles to be detected by the detection apparatus of the present invention are generated within the spectrometer vacuum chamber 14 and reach the window 17 of the detection apparatus after they have been deflected by the magnetic field a sufficient amount of time to separate the mass components. The operation of the detection apparatus after the charged particles enter the electrostatic shield 16 will be described in detail below in reference to Figure 2.

Figure 2:
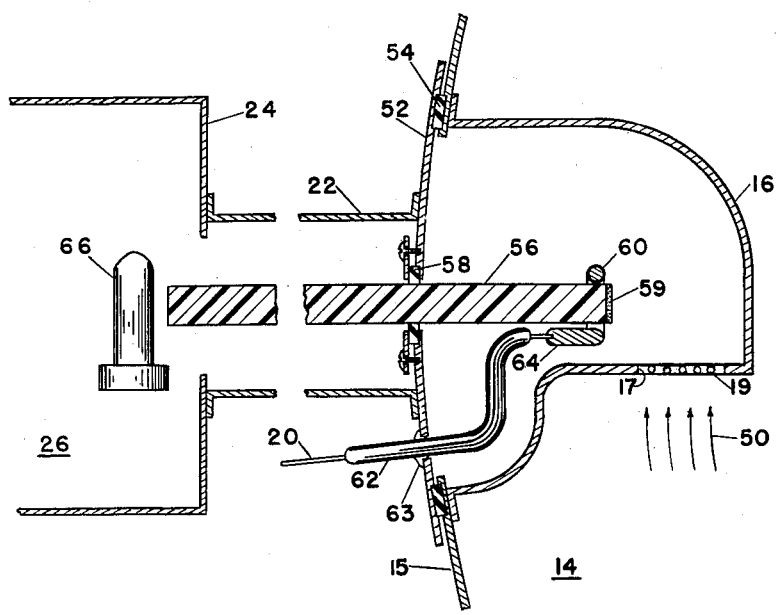
Figure 2 is a transverse sectional view of the apparatus taken along the line 2—2 of Figure 1 to show the internal construction of the detection apparatus of the present invention.

Referring to Figures 1 and 2 it is seen that the lines of magnetic flux are perpendicular to the plane of Figure 2. The relationship between the ion source of the spectrometer, the direction of the magnetic field and the detection apparatus is chosen so that the charged particles to be detected will move in the direction of the arrows 50 of Figure 2. The detection apparatus of the present invention is assembled on a mounting flange 52 which is connected to the wall 15 of the mass spectrometer vacuum chamber. The connection between wall 15 and mounting flange 52 is made vacuum-tight by means of a suitable gasket 54. Wall 15, housing 16 and flange 52 are all maintained at ground potential. An elongated translucent member 56 which may be cylindrical in shape is mounted on flange 52 and hermetically sealed by means of a gasket 58.

Mounted at one end of member 56 is a phosphor 59 which has the property of emitting photons when charged particles impinge thereon. In the art, this property of the material is known as scintillation. The phosphor may be mounted by any suitable means such as imbedding it in a thin layer of stopcock grease which will adhere to member 56. Also mounted at this end of member 56 is an electrically conductive ring 60 to which is applied a high accelerating potential. This potential is obtained on conductor 20 from the high voltage supply 18 shown in Figure 1. Between conductor 20 and flange 52 is a high voltage insulating material 62, such as glass, to prevent any breakdown between conductor 20 and flange 52 or other parts of the apparatus. Insulating material 62 is mounted in gas-tight fashion by means of a suitable sealing wax 63. Conductor 20 is soldered or welded to a larger wire 64 which is formed into ring 60 at its other end.

Located at the second end of member 56 is a conventional photo-multiplier tube 66. Tube 66 converts photons into an electron current which can be measured by a conventional meter or displayed on a cathode ray oscilloscope. Casing 24 serves as a magnetic shield as well as a light shield for tube 66.

The operation of the detection apparatus of the present invention will now be set forth. As hereinabove described the moving charged particles to be detected travel in the direction of arrows 50 and pass through the shield 16 by means of window 17. Grid wires 19 are at ground potential since they are mounted in shield 16. This prevents the accelerating potential applied to ring 60 from interfering with the charged particles in the magnetic field of the mass spectrometer apparatus. When the particles pass the grid wires 19 they are attracted towards phosphor 59 by means of the accelerating potential applied to ring 60. Due to the properties of the phosphor 59, it will emit photons at the instant of contact between the particles and the phosphor. As member 56 is translucent the photons will travel down the length of the rod where they are detected by photomultiplier tube 66 and registered in a conventional manner. The presence of light-tight shield 22 about member 56 prevents any photons due to incident light from affecting the operation of the apparatus. Also, magnetic and light shield 24 eliminates any effect of the magnetic field of the spectrometer on the operation of photomultiplier tube 66. Shield 24 also prevents any light from reaching tube 66 except that generated in phosphor 59.

Member 56 and shield 22 are shown broken away to indicate that they may be made any convenient length depending on the extent of the magnetic field. It is apparent that the various components of the apparatus may be made of any suitable size to cooperate with a particular analytical system. The dimensions will depend on the type of material used. In one convenient embodiment, for example, the detection apparatus is used in conjunction with a time-of-flight mass spectrometer. The elongated translucent member is one foot long, has a circular cross section one-half inch in diameter and is made of quartz. The phosphor used is anthracene and the accelerating potential is in the order of 30 kilovolts. The strength of the magnetic field can be about 600 gauss. Under these conditions the detector can attain an efficiency of 25%.

With proper translucent materials such as Lucite which is a methyl methacrylate plastics material the elongated member can be made in lengths of four feet and more and can be suitably curved so that the photons can be transmitted through any necessary angle to reach the photomultiplier tube.

The detection apparatus of the present invention has an improved signal-to-noise ratio when compared to conventional devices such as an electron multiplier. This is due to the fact that a single energetic ion can produce many photons to be detected by the photomultiplier tube. Accordingly a larger signal amplitude will result in the photomultiplier tube than would occur in an electron multiplier from a single ion.

By changing the polarity of the accelerating voltage the apparatus can be used to detect negative ions and electrons instead of positive ions. With the cathode ray oscilloscope 27 of Figure 1 connected to the output of the photomultiplier tube it is possible to determine the time of arrival of the ions if it is so desired.

The apparatus can be easily dismantled and a new luminescent material affixed to the end of member 56 merely by disconnecting flange 52 from wall 15. The electrostatic shield 16 can remain attached to the spectrometer wall.

In the foregoing description the term "luminescent material" is used as a generic term for any material that will emit photons upon the impingement of moving charged particles. Besides the anthracene used in the specific example, we have used silver-activated zinc sulphide and thallium-activated sodium iodide. It is not necessary that the luminescent material be secured to one end of the translucent member as the apparatus will operate satisfactorily with the material mounted near the end of the member.

Since many embodiments of the present invention might be made and since many other changes may be made in the preferred embodiment described above it is to be understood that the foregoing description is to be interpreted as illustrative only and not in a limiting sense except as required by the appended claims.

We claim:

1. In combination with a mass spectrometer having an evacuated chamber permeated by a magnetic field, a demountable light-tight apparatus for detecting ions traveling in said magnetic field and comprising, an enclosure removably mounted upon said chamber, an elongated translucent member extending from within said enclosure and having its first end within said magnetic field and its second end outside of said field, a luminescent material mounted at said first end of said member, an annular accelerating electrode surrounding said first end and adjacent to said luminescent material, a high voltage supply connected to said accelerating electrode, an electrostatic shield completely surrounding said first end of said translucent member, said luminescent material and said accelerating electrode, said shield having an aperture for the admission of said ions, a plurality of grid wires affixed across said shield aperture for shielding the ions in said magnetic field from the potential applied to said accelerating electrode, whereby ions entering through said aperture are attracted to said luminescent material by said accelerating electrode causing said material to emit photons for transmission through said translucent member, and means disposed adjacent said second end of said translucent member for the detection of said photons.

2. In combination with a mass spectrometer having an evacuated chamber permeated by a magnetic field, a demountable apparatus for the detection of ions moving in said magnetic field and comprising, an enclosure removably mounted upon said chamber, an elongated translucent member extending from within said enclosure and having its first end within said magnetic field and its second end external thereto, a light-tight shield surrounding substantially the entire length of said elongated member external to said enclosure, said light-tight shield having one of its ends affixed to the outer wall of said enclosure and its other end affixed to a second shield, means for detecting photons mounted adjacent the second end of said translucent member, said second shield permitting the exclusive detection of photons transmitted through said translucent member, a luminescent material mounted at the first end of said translucent member within said magnetic field, means including an accelerating electrode for attracting the ions to said luminescent material and causing the ions to impinge thereon whereby said material emits photons, proportional to the number of said ions, for transmission through said translucent member to said detection means.

3. In combination with a mass spectrometer having an evacuated chamber permeated by a magnetic field, a demountable apparatus for the detection of ions moving in said magnetic field and comprising, an enclosure removably mounted upon said chamber, an elongated translucent member extending from within said enclosure and having its first end within said magnetic field and its second end external thereto, a light-tight shield surrounding substantially the entire length of said elongated member external to said enclosure, said light-tight shield having one of its ends affixed to the outer wall of said enclosure and its other end affixed to a second shield, a photomultiplier tube mounted adjacent the second end of said translucent member, said second shield permitting the exclusive detection of photons transmitted through said translucent member, a luminescent material mounted at the first end of said translucent member within said magnetic field, an accelerating annular ring surrounding the first end of said member and adjacent said luminescent material, a high voltage supply connected to said accelerating ring in an hermetically sealed manner through said enclosure, an electrostatic shield completely enclosing the first end of said translucent member, said luminescent material and said accelerating ring, said electrostatic shield containing an aperture for the admission of said ions to be detected, a plurality of fine grid wires affixed across said aperture, whereby ions passing through said aperture are attracted by said accelerating ring to said luminescent material, causing the ions to impinge thereon and resulting in the emission of a proportional number of photons which are transmitted through said translucent member to said photomultiplier tube.

References Cited in the file of this patent

UNITED STATES PATENTS

| | | |
|---|---|---|
| 2,381,414 | Wilkie | Aug. 7, 1945 |
| 2,422,264 | Seaman | June 17, 1947 |
| 2,503,062 | Moriarty | Apr. 4, 1950 |
| 2,512,247 | Fua et al. | June 20, 1950 |
| 2,539,203 | Pohl | Jan. 23, 1951 |
| 2,575,769 | Rajchman et al. | Nov. 20, 1951 |

OTHER REFERENCES

"An Outline of Atomic Physics," Physics staff of University of Pittsburgh, published by John Wiley & Sons, Inc., New York, N. Y., 1937. Page 242.

Physical Review, vol. 73, June 1, 1948, page 1405.

Nucleonics, February 1949, pages 25–29.

"Radioactivity & Nuclear Physics," Cork, publ. by Van Nostrand, Inc., New York, N. Y., 2d edition, June 1950 (first published February 1947), page 68.